(12) United States Patent
Larsen (10) Patent No.: US 11,161,664 B2
(45) Date of Patent: Nov. 2, 2021

(54) SECURING DEVICE FOR STRAPS AND THE LIKE

(71) Applicant: Lyle D. Larsen, Truman, MN (US)

(72) Inventor: Lyle D. Larsen, Truman, MN (US)

(73) Assignee: Lyle D. Larson, Truman, MN (US)

( * ) Notice: Subject to any disclaimer, the term of this patent is extended or adjusted under 35 U.S.C. 154(b) by 0 days.

(21) Appl. No.: 16/850,581

(22) Filed: Apr. 16, 2020

(65) Prior Publication Data

US 2020/0339328 A1    Oct. 29, 2020

Related U.S. Application Data

(60) Provisional application No. 62/834,604, filed on Apr. 16, 2019.

(51) Int. Cl.
*B65D 63/10* (2006.01)
*F16G 11/14* (2006.01)

(52) U.S. Cl.
CPC ....... *B65D 63/109* (2013.01); *B65D 63/1018* (2013.01); *F16G 11/143* (2013.01)

(58) Field of Classification Search
CPC .. B65D 63/109; B65D 63/1018; B65D 63/14; F16G 11/143; F16G 11/14; Y10T 24/314; Y10T 24/316; Y10T 24/4755; Y10T 24/1404; Y10T 24/1406
See application file for complete search history.

(56) References Cited

U.S. PATENT DOCUMENTS

| | | | | |
|---|---|---|---|---|
| 1,196,555 A | * | 8/1916 | Lee | B65D 63/14 24/18 |
| 4,569,108 A | * | 2/1986 | Schwab | B62J 7/08 24/17 AP |
| 4,885,824 A | * | 12/1989 | Schwab | B65D 63/14 24/17 B |
| 5,893,456 A | * | 4/1999 | Bosmans | B65D 63/109 206/338 |
| 6,675,977 B2 | * | 1/2004 | Parks | A47L 15/505 211/41.8 |
| 7,107,654 B2 | * | 9/2006 | Byers | B65D 63/109 24/16 PB |
| 10,486,582 B1 | * | 11/2019 | Hamm | B60P 7/0846 |

* cited by examiner

*Primary Examiner* — Robert Sandy
(74) *Attorney, Agent, or Firm* — Billion & Armitage (57) ABSTRACT

A device for securing a bundled grouping such as a strap, hose, cable or wire, including a clip having a tongue element and latch structure and a cord attached at one end of the metal clip, with said clip adapted to be inserted between layers of the bundled grouping. The bundled grouping is secured by pulling on the cord and wrapping the cord around the bundled grouping and securing the cord to the latch structure on the clip and causing the tongue element of the clip to be pulled into the layers of the bundled grouping.

14 Claims, 13 Drawing Sheets

SECURING DEVICE FOR STRAPS AND THE LIKE

BACKGROUND

The present invention relates to straps, cords, hoses, webbing, etc., and more specifically, to devices used for securing such items, and in particular to devices used for securing a folded bundle or grouping of such items.

Articles having straps or webbing are well known for various purposes. For example, flat straps are used secure items or part of an item to another item or another part of the same item. Straps are often provided in a length sufficiently long for use in various configurations, and a ratchet or clamp device allows adjustment in the usable length of the strap. If the usable or "active" part of the strap is short, a long free end of the strap will extend from the assembly.

Well-known flat woven cargo straps have been used to secure loads upon a vehicle, etc. A ratchet device is used to tension the strap and secure the load. The unused end of the strap extends from the ratchet assembly and can be tied, taped, banded or otherwise secured to prevent damage or injury. In some situations a dangling, loose strap end can present safety concerns. For example, a loose end of a strap can become entangled in equipment or could obstruct or injure others nearby.

A need exists for a device to a secure loose strap end that is secure, strong and convenient to use. Yet another need exists for a device to secure cords, hoses and the like.

SUMMARY

The present disclosure describes a reusable mechanical device to secure loose strap ends and the like without damaging or degrading the usefulness or life of the strap. The mechanical device can also be used to secure a variety of different ropes, cables, wires and hoses.

In one aspect thereof, the present invention includes a metal clip for engaging a portion of a strap to be secured, the clip being configured with one or more tongue-structures adapted for insertion into one or more folded layers of the strap. The clip has a front portion and a rear portion. An elastic cord includes a first end connected to the metal clip and a distal end selectively connectable to and disconnectable from a latch on the metal clip. The latch selectively connects the distal end of the elastic cord to the rear portion of the clip. An adjusting device can be used to effectively shorten the elastic cord length so that the present invention can accommodate a wide variety of sizes of straps, hoses, etc. An accessory loop can be provided to connect the metal clip to a strap, hose, cord, etc. The accessory loop can be elastic and used to prevent loss of the metal clip in the event the primary elastic cord is inadvertently disengaged during use.

In another aspect thereof, the present invention includes a clip for engaging a portion of a strap to be secured, the clip being a plastic or polymer component, such as an injection molded component.

An advantage of the present invention is to provide a reusable device to secure loose ends of straps or webbing.

Another advantage of the present invention is providing a strap adjusting device so that the present invention can find wide applicability to secure a broad range of differently sized items.

Yet another advantage of the present invention is providing a strap securing device that can be reused without degrading the performance or life of the strap.

A further advantage of the present invention is providing a strap securing device that can be attached to a strap that is in use, without having to detach, loosen or unthread the strap.

Other features and advantages of the invention will become apparent to those skilled in the art upon review of the following detailed description, claims and drawings in which like numerals are used to designate like features.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
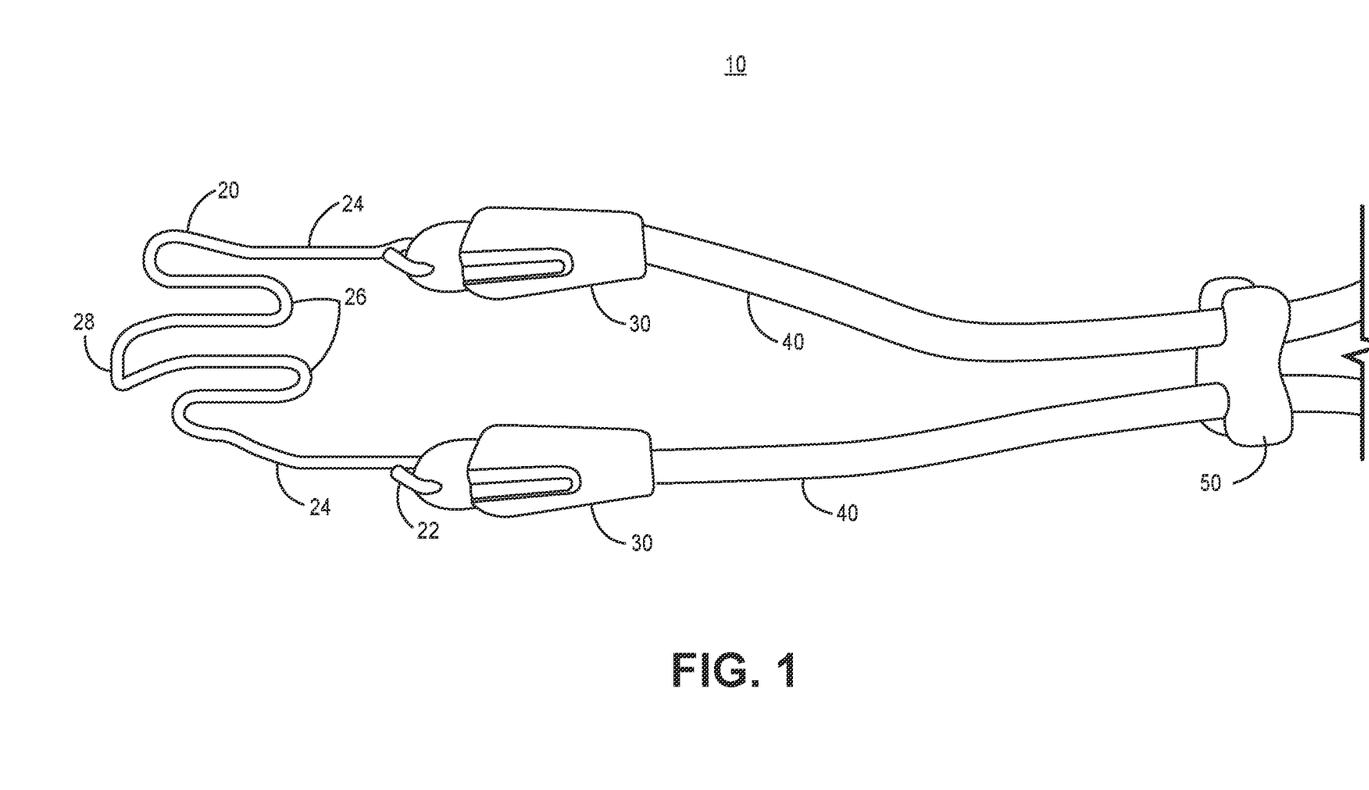
FIG. 1 illustrates a first embodiment of the present invention.

Referring now more specifically the drawings and to FIG. 1 in particular, a strap securing device 10 in accordance with the present invention is shown. As will become apparent from the following description in accordance with the drawings, strap securing device 10 can be used for securing portions of straps, cords, hoses and the like, of various sizes an in various applications.

Strap securing device 10 includes a metal clip 20 attached to an elastic cord 40. Cord 40 is shown as an elastic-type cord having a generally circular cross-section. Cord 40 in other embodiments of the present invention may include rubber-type cords having non-circular cross-sections. Cord 40 is intended to stretch but not break during normal use of strap securing device 10.

Cord 40 is secured to metal clip 20 via connector 30. In one example, end portions of cords 40 are passed through looped portions (eyelets) 22 of metal clip 20 and connectors 30 are used to capture and retain the end portions of cords 40. A variety of different connectors can be used to secure cord 40 to metal clip 20. For example, knots, clips, crimp-on fittings and other mechanical fasteners can be used to connect cord 40 to metal clip 20. A selectively movable adjuster 50 is used to connect cord 40 to latch 28 of metal clip 20.

An accessory loop can be provided to connect the metal clip 20 to a strap, hose, cord, etc. The accessory loop can be an elastic strap used to prevent loss of the metal clip 20 in the event the primary elastic cord 40 is inadvertently disengaged during use. Ends of the accessory loop can be secured to the metal clip 20 at the eyelets 22 and the accessory loop can be stretched to wrap around an item to be secured and be engage around the latch 28 to secure the metal clip 20 to the item. In one example, the accessory loop is an elastic cord having a diameter less than that of cord 40 and a length of between about 3 to 10 inches. The ends of the accessory loop can be secured to the eyelets 22 with a clamp or similar device.

In an illustrated embodiment, metal clip 20 is formed from wire and includes a pair of tongue elements 26 positioned on either side of centrally located latch 28. As will be described in greater detail hereinafter, tongue elements 26 are adapted to be inserted between strap layers to secure the clip 20 against a strap. Tongue elements 26 are separated from eyelets 22 by offset portion 24. Portion 24 is offset relative to a plane containing the tongue elements 26 to accommodate a thickness of one or more strap layers. Offset portion 24 is preferably long enough to span generally across a width of the strap to be secured.

Figure 2:
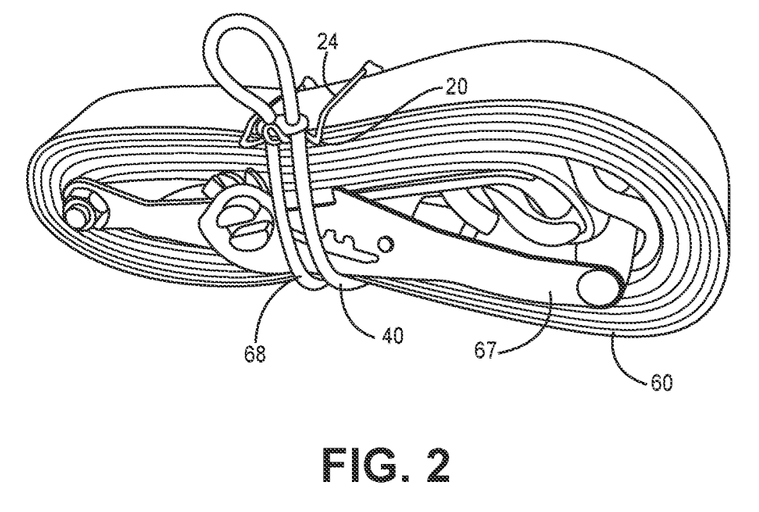
FIG. 2 illustrates the device of FIG. 1 wrapped around and securing a bundled grouping including straps and a ratchet device.

FIG. 2 illustrates the strap securing device 10 engaging a strap 60. Strap 60 is an elongate web of material, such as, for example, a flat synthetic cargo strap. Strap 60 is shown encircling a ratchet device 67 and having a terminal end 68. In this illustration, strap securing device 10 is shown securing multiple layers of the strap folded around ratchet device 67. However, it should be understood from the description that strap securing device 10 can be installed on other portions of the strap. Further, in some applications and uses, a strap securing device of the present invention can be secured to or on an article in an appropriate position to receive and hold portions of a strap used on or with the article.

Figure 3:
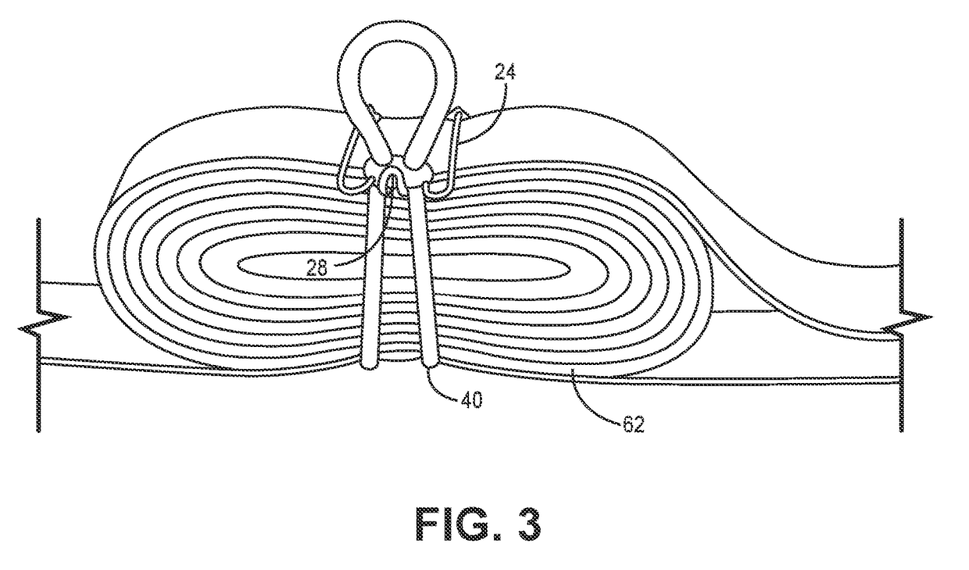
FIG. 3 illustrates the device of FIG. 1 wrapped around a rolled strap end and active portion of the strap.

FIG. 3 illustrates the strap securing device 10 engaging a coiled roll of strap 62. In this view, strap 62 includes the coiled strap end such as present after the strap is used to secure a load on a vehicle. In this example, strap securing device 10 is shown securing the unused portion of strap 62 upon the active or useful portion of the strap.

Figure 4:
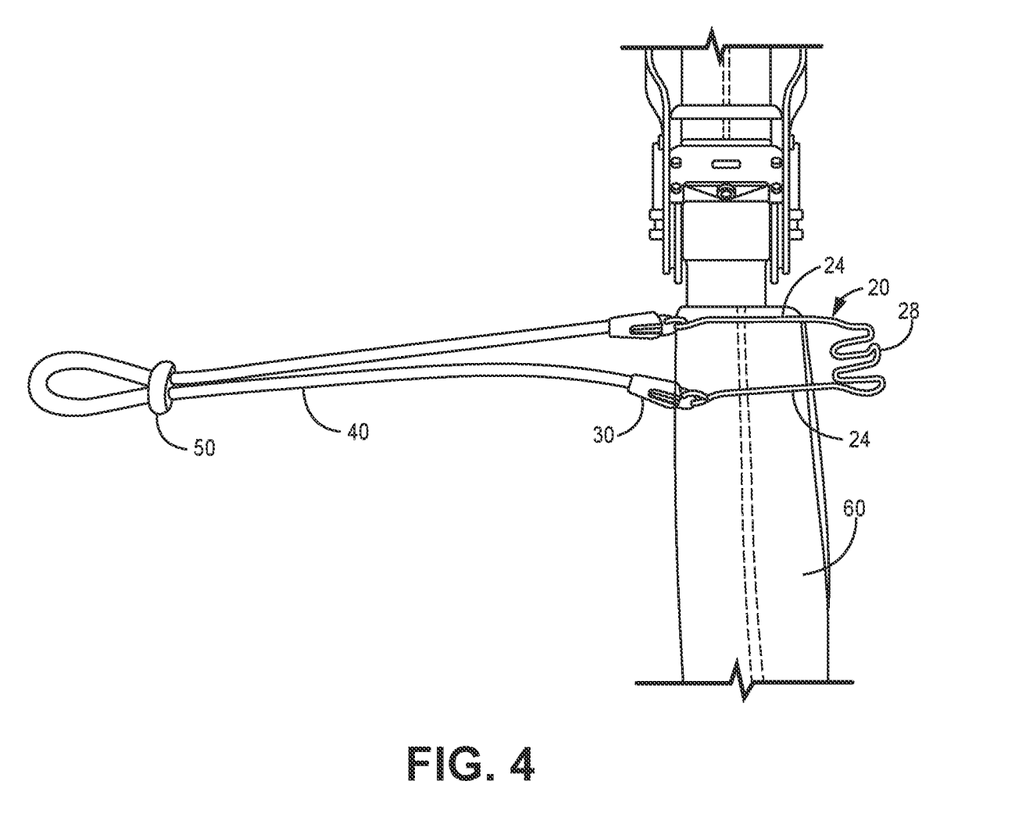
FIG. 4 depicts the device of FIG. 1 in the process of being secured to a rolled strap portion.

FIG. 4 depicts a method of using the strap securing device 10 to secure a strap 60. Strap securing device 10 is placed against a coil of load straps 60 with tongue elements 26 positioned for insertion between one or more layers of load strap 60 and with latch element 28 extending upwardly and away from strap 60. A user then secures the metal clip 20 to the load strap 60 by pulling on cord 40 and wrapping cord 40 around load strap 60. Adjuster 50 then engages latch element 28 to secure the load strap 60.

Figure 5:
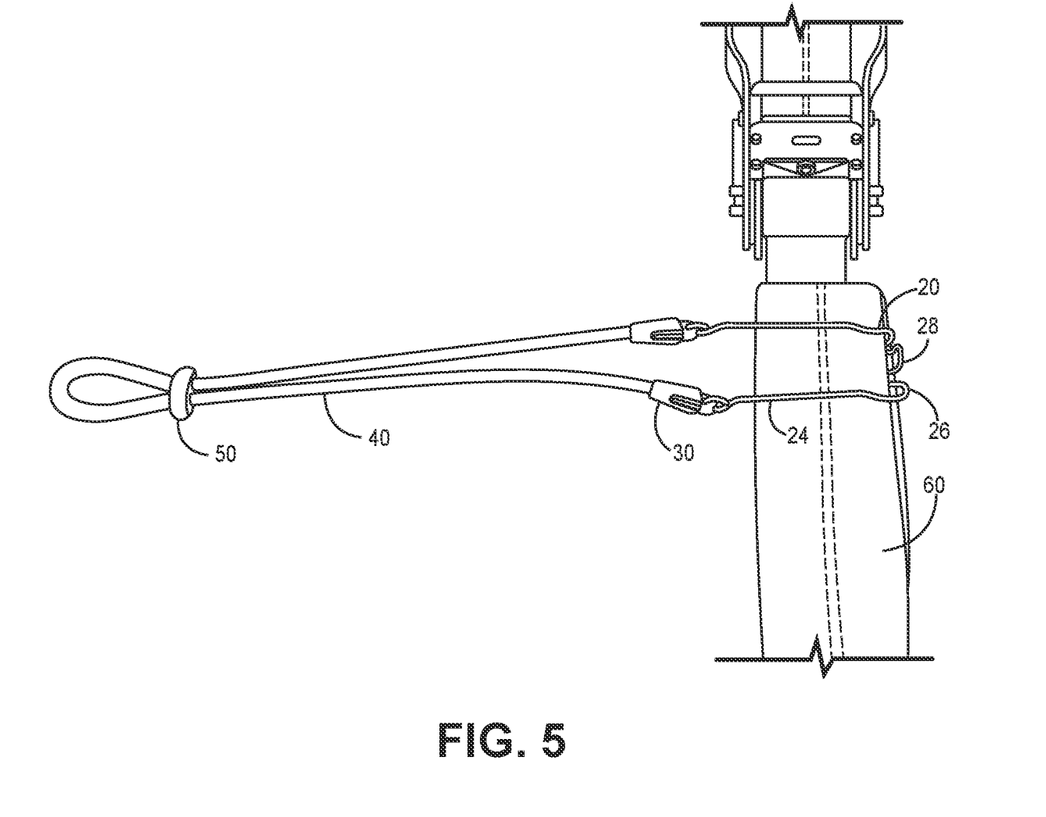
FIG. 5 depicts the device and strap of FIG. 4 with the tongue elements of the metal clip being inserted into the strap roll.

FIG. 5 illustrates the strap securing device 10 with the tongue elements 26 inserted between layer(s) of load strap 60. Once the tongue element 26 is so inserted, the cord 40 can be wrapped around the load strap 60 and adjuster 50 can engage latch 28. In this manner, strap securing device 10 can be easily installed by the user, often with only one hand. To remove strap securing device 10, cord 40 can be pulled to release engagement between adjuster 50 and latch 28.

Figure 6:
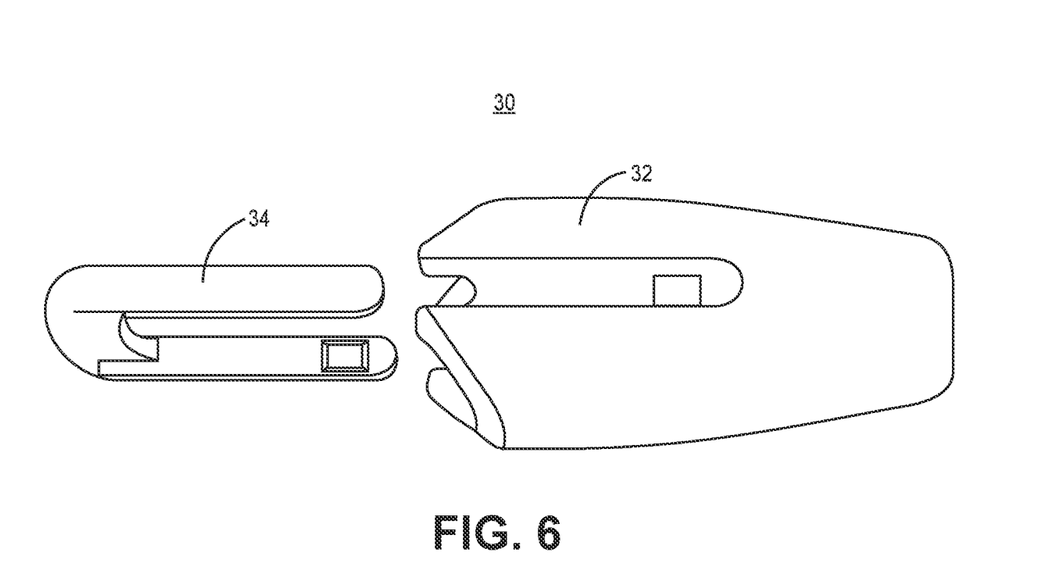
FIG. 6 illustrates a connector used to secure a cord to the metal clip according to one embodiment of the present invention.

FIG. 6 illustrates connector 30 including a connector body 32 and generally U-shaped retainer 34. Connector body 32 holds a folded portion of cord 40 with the retainer 34 inserted into connector body 32 to secure the end of cord 40.

Figure 7:
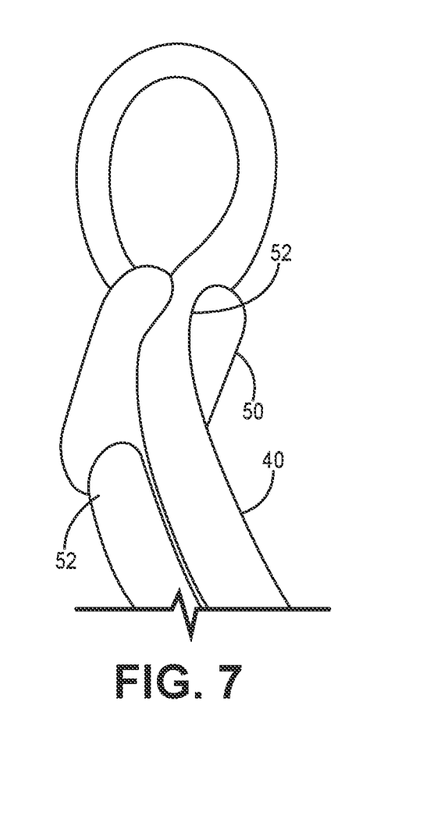
FIG. 7 illustrates an adjuster used to connect a cord end to a latch structure on the metal clip according to one embodiment of the present invention.

FIG. 7 illustrates one embodiment of an adjuster 50. Two portions of cord 40 are inserted into openings 52 of adjuster 50. The openings 52 are sized to frictionally engage and retain the cord 40. Adjuster 50 can be slid along a length of cord 40 so as to adjust a usable length of cord 40. For example, adjuster 50 can be slid toward the end of cord 40 so that strap securing device 10 can accommodate a relatively larger strap coil. Then for smaller items, adjuster 50 can be slid on cord 40 closer to clip 10 to shorten the effective length of cord 40.

Figure 8:
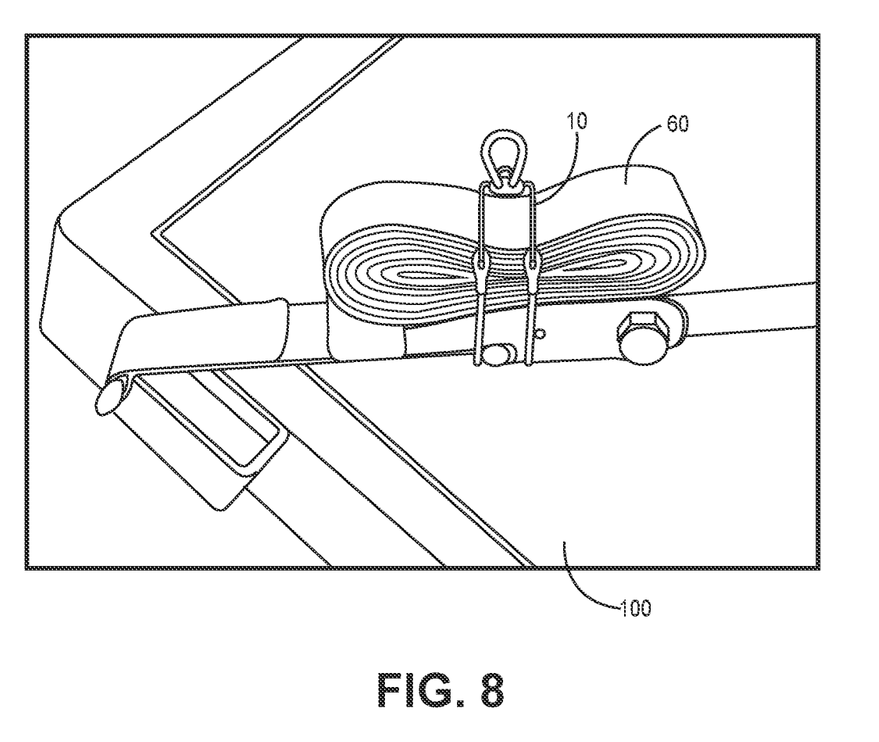
FIG. 8 illustrates the embodiment of FIG. 1 securing a rolled strap end to a strap ratchet device and strap under load.

FIG. 8 illustrates the strap securing device 10 securing a coiled strap 60 after the strap has been tightened to secure a load on a vehicle.

Figure 9:
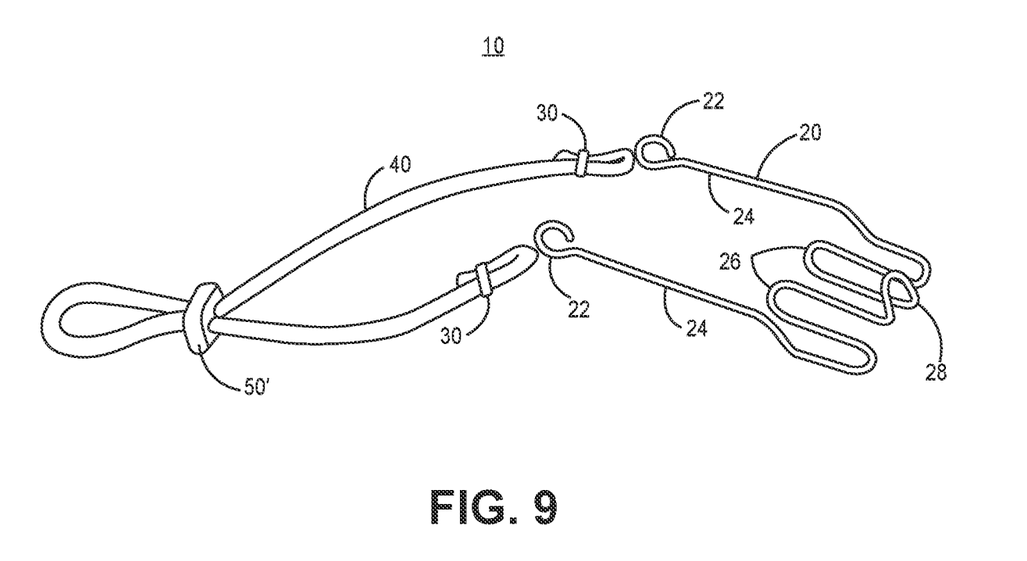
FIG. 9 illustrates a second embodiment of the present invention.

FIG. 9 illustrates another embodiment of the strap securing device 10. In this version, cords 40 are simply secured with a mechanical crimp 30'.

Figure 10:
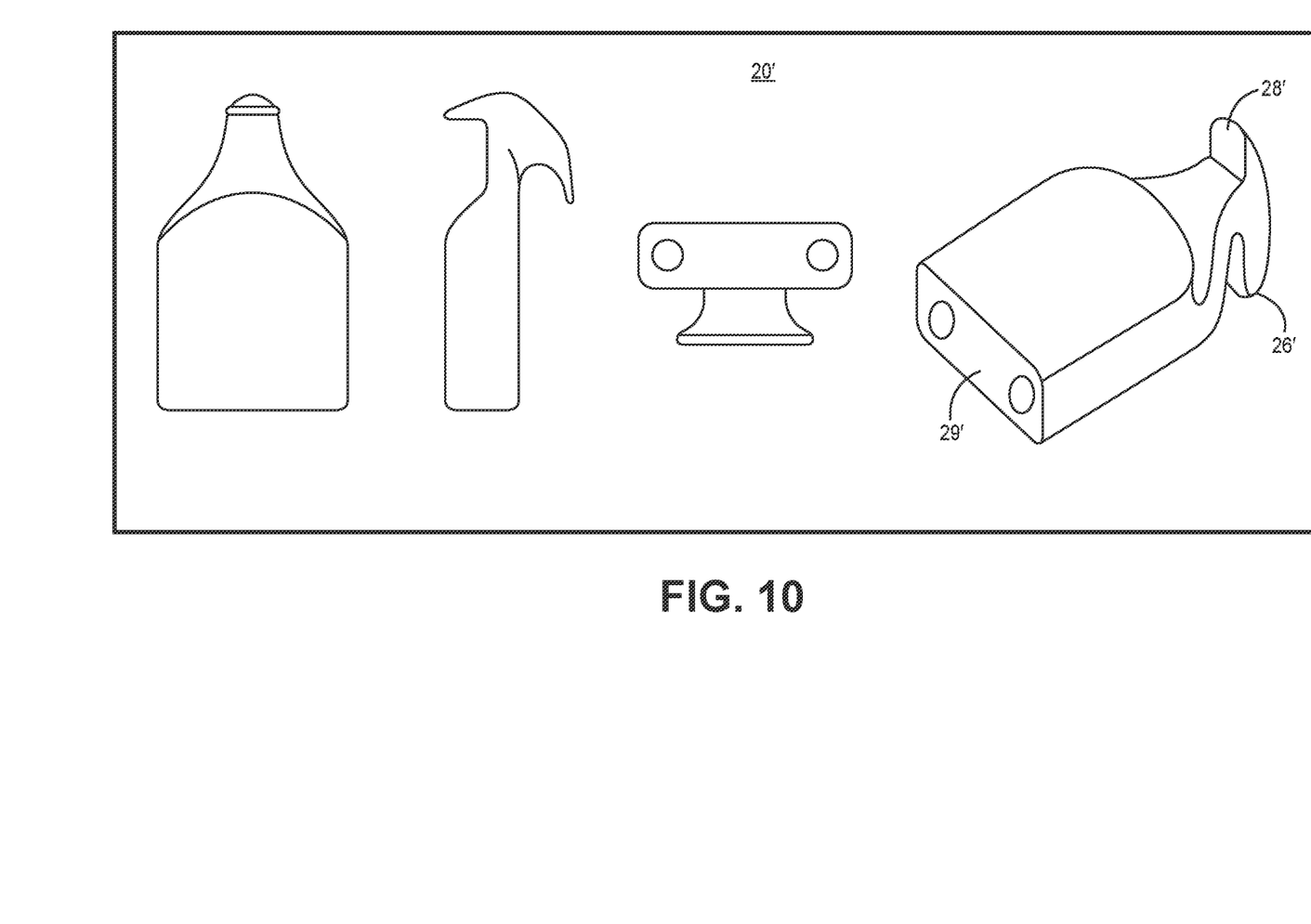
FIG. 10 illustrates another embodiment of the clip portion of the invention of FIG. 1.

FIG. 10 illustrates various views of another embodiment of clip 20'. In this version, clip 20' is molded or cast from plastic, metal or the like. For example, clip 20' may be an injection-molded plastic component. Clip 20' includes a tongue element 26' and a latch element 28'. A cord (not shown) is connected at end 29' and is pulled and wrapped around the strap or other item and secured to latch 28'.

Figure 11:
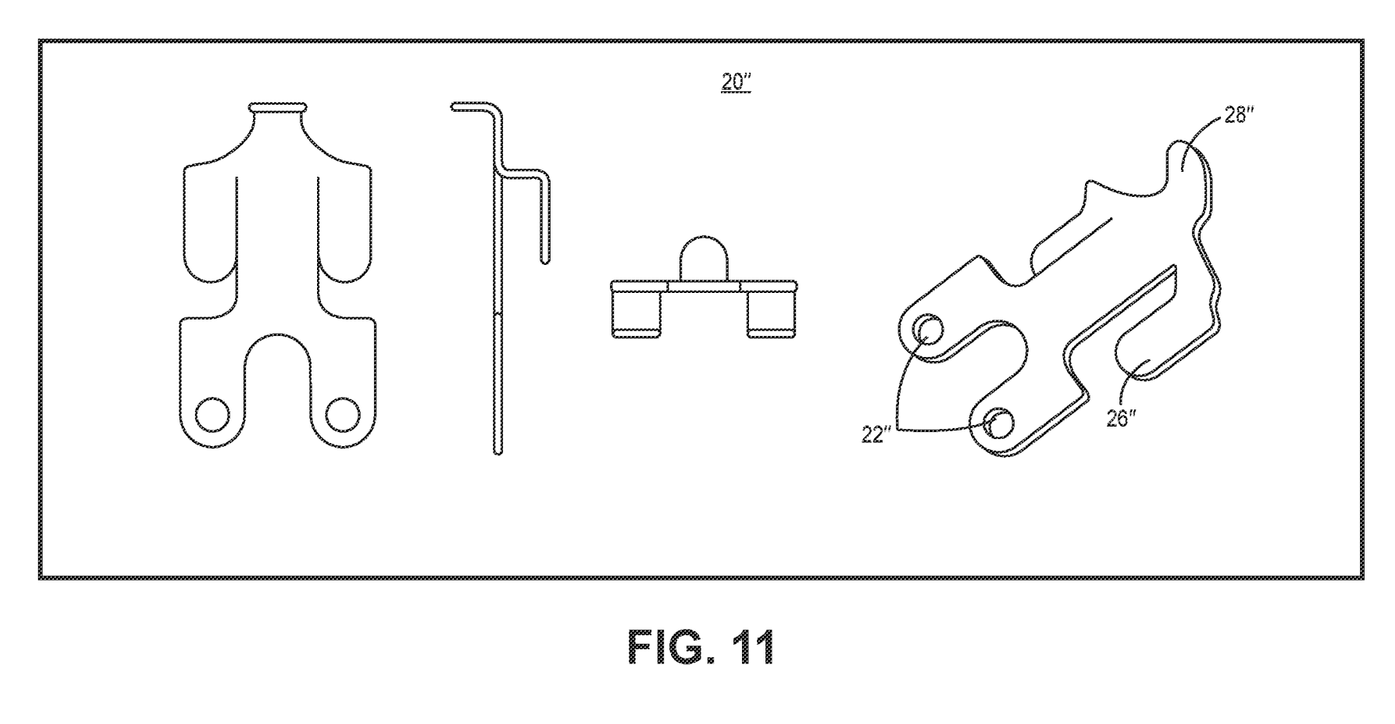
FIG. 11 illustrates another embodiment of the clip portion of the invention of FIG. 1.

FIG. 11 illustrates various views of another embodiment of clip 20". In this version, clip 20" is a stamped metal element. A pair of apertures 22" are used to secure a strap (not shown) to clip 20". After the tongue elements 26" are inserted between layer(s) of straps, for example, the securing cord is then wrapped around the item to be secured and engages latch 28" in a manner similar to that described above.

Figure 12:
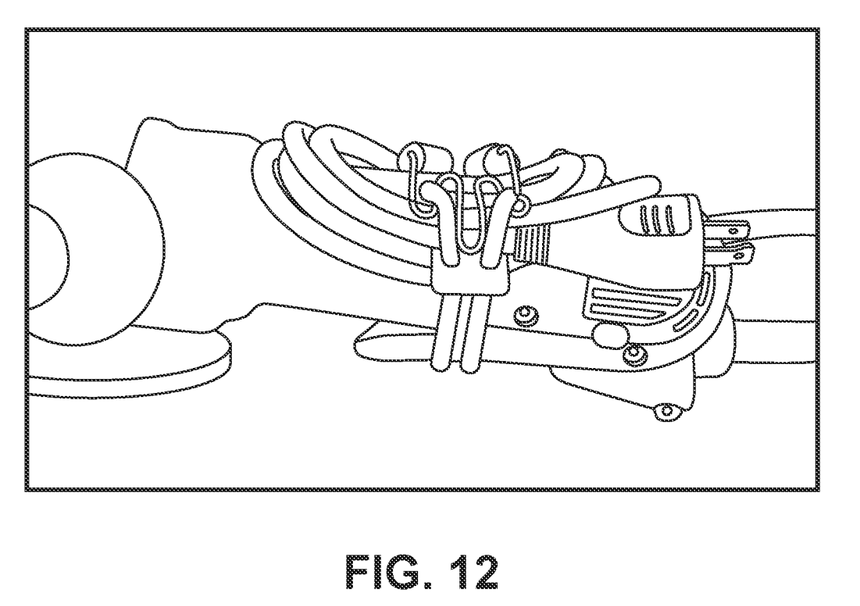
FIG. 12 illustrates the securing device according to one embodiment of the invention secured to an electric tool and cord.

FIG. 12 illustrates the strap securing device 10 wrapped around an electric tool. In this example, the loop end of strap 40 is captured by metal clip 20 without use of latch 28.

Figure 13:
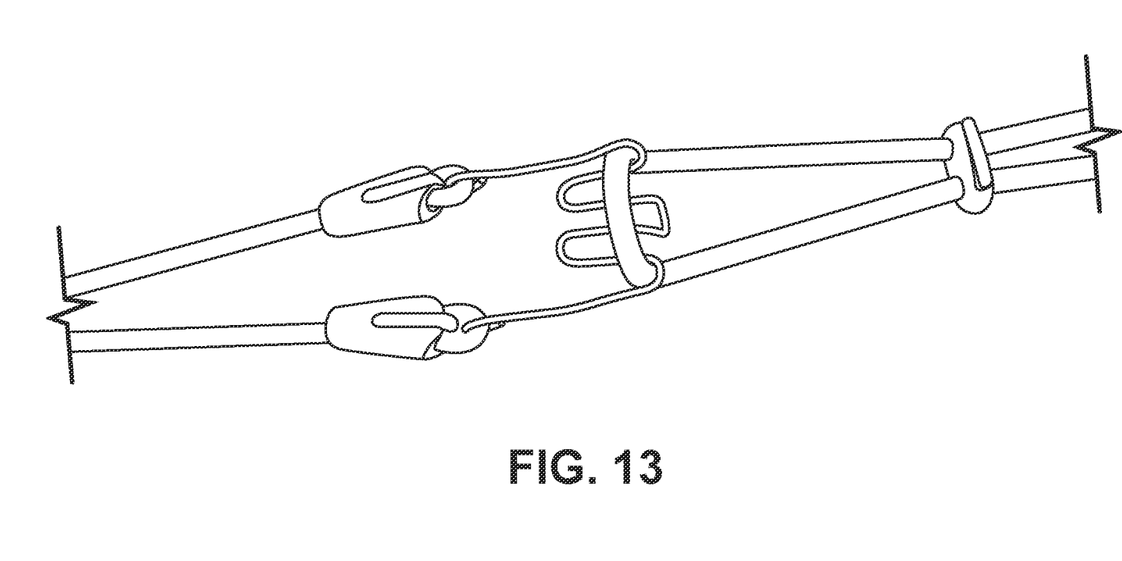
FIG. 13 illustrates a pair of securing device of FIG. 1 secured together in end-to-end fashion to provide a securing device assembly capable of securing a larger bundled of items.

FIG. 13 illustrates a pair of strap securing device 10 connected together in end-to-end manner to produce a strap securing device having greater capacity. As shown, the loop end of cord 40 of a first strap securing device 10 is captured by the metal clip 20 of the second strap securing device 10.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

What is claimed is:

1. A strap securing device comprising:
   a metal clip having a tongue element and a latch structure; and
   an elastic cord secured to the metal clip, with an end of said cord adapted to wrap around an object to be secured and connect to the latch structure, wherein the tongue element is adapted to be inserted into the object to be secured, and wherein the cord is wrapped around the object by pulling on the cord in a first direction and then around the object, and with said pulling causing the tongue element to be pulled into the object to be secured.

2. The device of claim 1, wherein the tongue element includes a pair of tongue elements, with the latch structure positioned between the pair of tongue elements.

3. A method of securing a strap end portion, comprising:
   bundling a strap end portion;
   aligning a rigid clip having a tongue element and latch structure relative to the strap end portion;
   inserting the tongue element between layers of the bundled strap end portion;
   pulling on an elastic cord attached to the rigid clip causing the tongue element to be further inserted into the layers;
   wrapping the elastic cord around the bundled strap end portion; and
   connecting the elastic cord to the latch structure to secure the rigid clip and cord to the bundled strap end portion.

4. A device for securing a bundled grouping of items, comprising:
   a clip having a tongue element and latch structure; and
   a cord attached at one end of the clip, with said clip adapted to be inserted between layers of a bundled grouping of items, the bundled grouping of items being of straps, hoses, cables or wires, and wherein the bundled grouping is secured by pulling on the cord and wrapping the cord around the bundled grouping and securing the cord to the latch structure on the clip, and with said pulling on the cord causing the tongue element of the clip to be pulled into the layers of the bundled grouping.

5. The device of claim 4 wherein the tongue element includes a pair of tongue elements with the latch structure positioned between the pair of tongue elements.

6. The device of claim 4 wherein the clip is a metal clip.

7. The device of claim 6 wherein the metal clip is formed form wire.

8. The device of claim 7 further comprising an adjuster connected to the cord and adapted to engage the latch structure of the metal clip.

9. The device of claim 6 wherein the metal clip is a metal stamping.

10. The device of claim 4 wherein the clip is a plastic component.

11. The device of claim 10 wherein the clip is an injection-molded plastic component.

12. The device of claim 4 wherein the adjuster is adapted to slide along a length of the cord so as to adjust an effective length of the cord so that the device accommodates a variety of sizes of bundled groupings.

13. The device of claim 4 wherein the cord is an elastic cord having a generally circular cross section.

14. The device of claim 4 wherein the cord is attached to a pair of eyelets on the metal clip.

* * * * *